United States Patent [19]

Miki

[11] Patent Number: 5,687,055
[45] Date of Patent: Nov. 11, 1997

[54] CONDUCTIVE PASTE AND ITS USAGE

[75] Inventor: Hisashi Miki, Nagaokakyo, Japan

[73] Assignee: Murata Manufacturing Co., Ltd., Japan

[21] Appl. No.: 368,426

[22] Filed: Jan. 4, 1995

[30] Foreign Application Priority Data

Jan. 10, 1994 [JP] Japan ..................... 6-000790

[51] Int. Cl.$^6$ .................................................. H01G 4/008
[52] U.S. Cl. .................. 361/305; 361/321.4; 361/321.5; 361/306.3; 252/514; 427/79
[58] Field of Search ..................... 361/305, 320, 361/321.2, 321.3, 321.4, 321.5, 306.3, 330; 252/511, 512, 502, 514; 427/79; 428/632; 29/25.41

[56] References Cited

U.S. PATENT DOCUMENTS

| | | | |
|---|---|---|---|
| 4,559,279 | 12/1985 | Honjo et al. | 428/632 |
| 4,642,202 | 2/1987 | Railsback | 252/511 |
| 4,765,929 | 8/1988 | Shaffer | 252/511 |
| 4,888,135 | 12/1989 | Tsunaga et al. | 252/512 |
| 4,965,698 | 10/1990 | Thoma et al. | 361/286 |
| 5,254,360 | 10/1993 | Crownover et al. | 427/79 |
| 5,316,698 | 5/1994 | Tani et al. | 252/512 |

FOREIGN PATENT DOCUMENTS

| | | |
|---|---|---|
| 5195260 | 8/1993 | Japan. |
| 1187360 | 4/1970 | United Kingdom. |

OTHER PUBLICATIONS

WPI Abstract Accession No. 85-071409/12; JP 600025289 (Tanaka Matthey) Feb. 8, 1985.

WPI Abstract Accession No. 93-354431/45; JP 050258608 (NEC) Oct. 8, 1993.

Primary Examiner—Leo P. Picard
Assistant Examiner—Anthony Dinkins
Attorney, Agent, or Firm—Ostrolenk, Faber, Gerb & Soffen, LLP

[57] ABSTRACT

Thin, smooth conductive layers for internal electrodes of multilayer ceramic capacitors are produced by a method including the steps of forming a conductive paste layer on a green ceramic sheet with a conductive paste by screen printing so as to have a center-line mean roughness of not more than 1.0 μm, a ten-point mean roughness of not more than 5.0 μm and a thickness of metal in the dried conductive paste layer of 0.5 to 2.0 μm. The conductive paste consists essentially of 50 to 70% of an organic vehicle and 30 to 50% of a metal powder with a particle size range of 0.1 to 1.5 μm and a mean particle size of 0.3 to 1.0 μm.

3 Claims, 1 Drawing Sheet

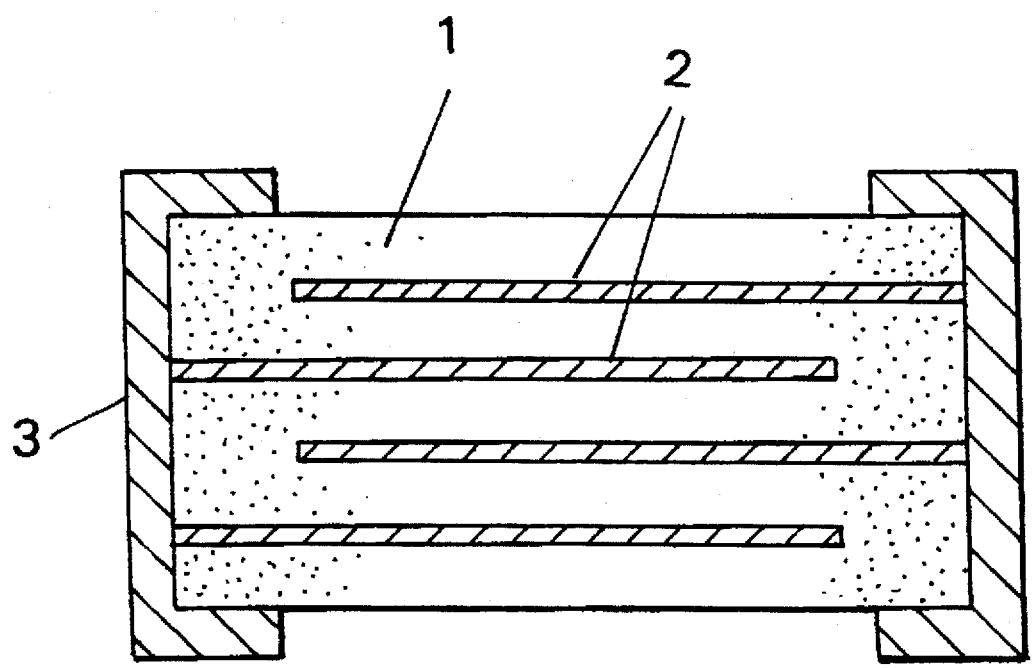

CONDUCTIVE PASTE AND ITS USAGE

BACKGROUND OF THE INVENTION

1. Field of the Invention

The present invention relates to a conductive paste and its usage and, more particularly, to a conductive paste and a method for production of multilayer ceramic capacitors employing the same as a material for internal electrodes of multilayer ceramic capacitors.

2. Description of the Prior Art

With recent miniaturization and densification of electronic equipment, considerable progress has made in miniaturization, enlargement in capacitance, and densification of multilayer ceramic capacitors. Such multilayer ceramic capacitors are generally produced by the steps of preparing ceramic green sheets with a dielectric ceramic composition, applying a conductive paste on respective green ceramic sheets by screen printing, stacking and bonding the green ceramic sheets by thermocompression, cutting the resultant multilayered body into green ceramic capacitor chips, firing the green chips to form capacitor chips with internal electrodes, and finally forming external electrodes connected to the internal electrodes on opposed sides of each of the capacitor chips to complete multilayer ceramic chip capacitors.

The conductive paste used in the above screen printing is generally composed of a metal powder, e.g., Pd with a particle size of 2 to 5 µm, dispersed in an organic vehicle, the organic vehicle being composed of an organic binder such as ethyl cellulose or alkyd resin and a solvent therefor.

When producing the multilayer ceramic capacitors, it is required to apply the conductive paste to ceramic green sheets so that the resultant conductive layers have a dried thickness of 5 to 10 µm. If the thickness of the dried conductive paste layers is less than 5 µm, the internal electrode layers produced therefrom by firing are cracked and form a reticular structure, resulting in deterioration of electric characteristics such as capacitance and ESR. If the thickness of the dried conductive layers exceeds more than 10 µm, it is difficult to improve the capacitance-volume ratio of the multilayer ceramic capacitors.

In order to meet demands for the miniaturization and densification of electronic equipment, it is required to make the dielectric layers thin as well as to increase the number of the internal electrode layers in the multilayer ceramic capacitors. However, the dried conductive paste layers of the prior art with a thickness of 5 to 10 µm are too thick to produce multilayer ceramic capacitors with good reliability. Use of the conductive paste layers of the prior art can cause insufficient removal of the organic binder and large internal stresses in the green ceramic capacitor chips, resulting in occurrence of internal defects such as delamination.

SUMMARY OF THE INVENTION

It is therefore an object of the present invention to provide a conductive paste which overcomes the aforesaid disadvantages and enables formation of thin, smooth internak electrodes of multilayer ceramic capacitors by screen printing.

Another object of the present invention is to provide a method of producing multilayer ceramic capacitors which have good electrical properties and are free from internal defects such as delamination.

BRIEF DESCRIPTION OF THE DRAWINGS

The sole FIGURE is a schematic sectional view of a multilayer ceramic capacitor comprising dielectric ceramic layers 1, internal electrodes 2 and external electrodes 3.

According to the present invention, there is provided a conductive paste for internal electrodes of multilayer ceramic capacitors, said conductive paste consisting essentially of 50 to 70% of an organic vehicle and 30 to 50% of a metal powder dispersed therein, said metal powder having a particle size range of 0.1 to 1.5 µm and a mean particle size of 0.3 to 1.0 µm.

As a metal powder used in the above conductive paste, there may be used any metals with good electric conductivity. However, it is most preferred to use Pd singly or in combination with at least metal selected from the group consisting of Ag, Au and Pt. If Pd is used in combination with at least one other noble metals, they may be mixed in any ratio.

The organic vehicle is generally composed of an organic binder dispersed in an organic solvent. As an organic solvent, any desired synthetic resin may be used, singly or in combination, including ethyl cellulose, acrylic resin, alkyd resin and other resins widely used in the conventional conductive paste for the internal electrodes. As the organic solvent, any desired solvent may be used singly or in combination, including α-terpineol, butyl carbitol, kerosene and other solvents widely used in the conventional conductive paste for the internal electrodes.

Preferably, the conductive paste according to the present invention is applied to a green ceramic sheet by screen printing and then dried to form a conductive paste layer with a center-line mean roughness of not more than 1.0 µm, a ten-point mean roughness of not more than 5.0 µm and a metal thickness of 0.5 to 2.0 µm.

According to the present invention, there is further provided a method for manufacturing multilayer ceramic capacitors comprising the steps of forming a conductive paste layer with a conductive paste by screen printing on green ceramic sheets, stacking the resultant green ceramic sheets to form a multilayered body, and firing the multilayered body, said conductive paste consisting essentially of 30 to 50% of a metal powder and 50 to 70% of an organic vehicle, said metal powder having a size range of 0.1 to 1.5 µm and a mean particle size of 0.3 to 1.0 µm.

These and other objects and features of the present invention will become clear from the following examples.

EXAMPLES

Using Pd powder with the particle size range of 0.1 to 1.5 µm and a mean particle size of 0.3 to 1.0 µm, several samples of palladium pastes were prepared by mixing 20 to 60 weight percent of palladium powder and 80 to 40 weight percent of an organic vehicle in the ratio shown in Table 1. The organic vehicle used was prepared by dissolving ethyl cellulose, acrylic resin and alkyd resin in α-terpineol.

Separate from the above, ceramic green sheets with a thickness of 20 µm were prepared by mixing a ceramic raw material of a $BaTiO_3$ system with a powder form with a suitable amount of an organic binder, polyvinyl butyral and a suitable amount of toluene to prepare a slurry and forming the resultant slurry into green ceramic sheets by the Doctor blade method.

Each conductive paste prepared as above was applied to one surface of the green ceramic sheet by screen-printing and then dried to form a Pd paste layer. For the resultant Pd paste layers, the surface roughness was measured by a tracing type surface-roughness tester to determine the center-line mean roughness (Ra) and ten-point mean roughness (Rz) specified in Japanese Industrial Standard (JIS) B 0601. The thickness of Pd in the Pd paste layer was determined by the intensity of fluorescence X-rays emitted by applying X-rays to the Pd paste layer. The results are shown in Table 1 along with composition of the Pd paste.

Then, the printed green ceramic sheets with the Pd paste layer were placed one on another so that each Pd paste layer was sandwiched between two green ceramic layers. The resultant multilayered body of the green ceramic sheets was then sandwiched by a pair of green ceramic sheets with no Pd paste layer, bonded by thermal-compression, and then cut into green ceramic capacitor chips with a required size. The resultant green ceramic capacitor chips were heat-treated to about 500° C. to remove the organic binder in the green chips, and then further heated to and maintained at a temperature of 1300° C. for 2 hours, thereby sintering the ceramic layers of the capacitor chips. The resultant ceramic capacitor chips with internal electrodes were provided with external electrodes by applying Ag paste on opposed sides of the capacitor chips and then baking it at 750° C. to complete multilayer ceramic capacitors.

For the resultant multilayer ceramic capacitor, ESR was measured and 100 pieces of the samples were cut in the direction perpendicular to planes of the internal electrodes. After polishing the cut plane, the samples were observed with a microscope to determine occurrence of delamination between the internal electrode and ceramic dielectric layer. The results are shown in Table 1.

In Table 1, the reference numerals with an asterisk are specimens out of the scope of the present invention, while others are those falling within the scope of the present invention.

layers and the resultant metal layers serving as the internal electrodes, like in specimen No. 4. If the mean particle size of the Pd powder exceeds 1.0 μm, the center-line mean roughness (Ra) of the metal paste layer becomes large, e.g., 1.85 μm and the ten-point mean roughness (Rz) becomes large, e.g., 6.00 μm like in specimen No. 5, resulting in considerable increase in ESR of the multilayer ceramic capacitor, e.g., 800 mΩ like in like as specimen No. 5. For these reasons, the mean particle size of the metal powder to be used has been limited to a value with in the range of 0.3 μm to 1.0 μm inclusive.

Further, the metal powder to be used is required to has particle sizes ranging from 0.1 to 1.5 μm in addition to the mean particle size defined as above. If the particle size of the metal powder is less than 0.1 μm, shrinkage of metal paste layer becomes large when converting it into a metal layer by firing, resulting in occurrence of delamination between the ceramic dielectric layers and the resultant metal layers serving as the internal electrodes. If the particle size of the metal powder exceeds more than 1.5 μm, it is impossible to obtain thin smooth metal paste layer.

The reasons why the content of the metal powder has been limited to the above range are as follows: If the content of the metal powder is less than 30 percent by weight (wt %), the thickness of the metal in the conductive metal paste layer becomes less than 0.3 μm, resulting in considerable increase in ESR of the multilayer ceramic capacitor, e.g., 9500 mΩ, as in specimen No. 6. If the content of the metal powder exceeds 50 wt %, the thickness of the metal in the conductive metal paste layer becomes large, e.g., 3.0 μm and the center-line mean roughness (Ra) of the metal paste layer

TABLE 1

| | Pd paste | | | Pd paste layer | | | Multilayer Ceramic Capacitor | |
|---|---|---|---|---|---|---|---|---|
| | mean | Composition | | Thickness | Roughness | | | |
| | size | (wt %) | | of Pd | Ra | Rz | ESR | Delamination |
| No. | (μm) | Pd | Vehicle | (μm) | (μm) | (μm) | (mΩ) | (pieces) |
| 1 | 0.3 | 30 | 70 | 0.5 | 0.24 | 2.50 | 300 | 0/100 |
| 2 | 1.0 | 40 | 60 | 1.0 | 0.50 | 3.00 | 250 | 0/100 |
| 3 | 1.0 | 50 | 50 | 2.0 | 0.95 | 4.80 | 250 | 0/100 |
| 4* | 0.2 | 50 | 50 | 2.0 | 0.95 | 4.85 | 250 | 3/100 |
| 5* | 1.5 | 50 | 50 | 2.0 | 1.85 | 6.00 | 800 | 0/100 |
| 6* | 0.2 | 20 | 80 | 0.3 | 0.30 | 2.60 | 9500 | 0/100 |
| 7* | 1.0 | 60 | 40 | 3.0 | 1.50 | 5.00 | 250 | 8/100 |

As cam be seem from the results shown in Table 1, the use of the Pd paste according to the present invention enables one to form Pd paste layer having a metallic palladium thickness of 0.5 to 2.0 μm, a center-line mean roughness (Ra) of not more than 1.0 μm and a ten-point mean roughness (Rz) of not more than 5.0 μm. Further, the multilayer ceramic capacitors of the present invention have good ESR of less than 300 mΩ and no delamination between the ceramic dielectric layers and the internal electrodes.

The conductive paste of the present invention has been limited to those consisting essentially of 50 to 70% of an organic vehicle and 30 to 50% of a metal powder dispersed therein, said metal powder having a size range of 0.1 to 1.5 μm and a mean particle size of 0.3 to 1.0 μm for the following reasons.

If the mean particle size of the metal powder is less than 0.3 μm, shrinkage of the metal paste layer becomes large when converting it into a metal layer by firing, resulting in occurrence of delamination between the ceramic dielectric becomes large, e.g., 1.5 μm, resulting in occurrence of delamination between the ceramic dielectric layers and the resultant metal layers serving as the internal electrodes.

In the above examples, Pd powder is employed alone as the metal powder. However, the metal powder to be used is not limited to the Pd powder. Similar results can be obtained by use of a mixture of Pd powder and powder of at least one metal consisting of Ag, Au and Pt.

Although the present invention has been fully described in connection with the preferred embodiments thereof, it is to be noted that various changes and modifications are apparent to those skilled in the art. Such changes and modifications are to be understood as included within the scope of the present invention as defined by the appended claims unless they depart therefrom.

What is claimed is:

1. A conductive paste used for forming internal electrodes of multilayer ceramic capacitors, consisting essentially of 50 to 70% of an organic vehicle and 30 to 50% of a metal powder dispersed therein, said metal powder having a particle size range of 0.1 to 1.5 μm and a mean particle size of 0.3 to 1.0 μm, wherein said metal powder consists of Pd powder or consists of a mixture of Pd powder and at least one metal powder selected from the group consisting of Ag powder, Au powder and Pt powder.

2. The conductive paste according to claim 1 wherein said metal powder consists of Pd.

3. The conductive paste according to claim 1 wherein said metal powder consists of Pd and at least one metal selected from the group consisting of Ag, Au and Pt.

* * * * *